April 13, 1926.
D. L. LANGHOFER
CORN TOPPING MACHINE
Filed Dec. 26, 1924
1,580,616
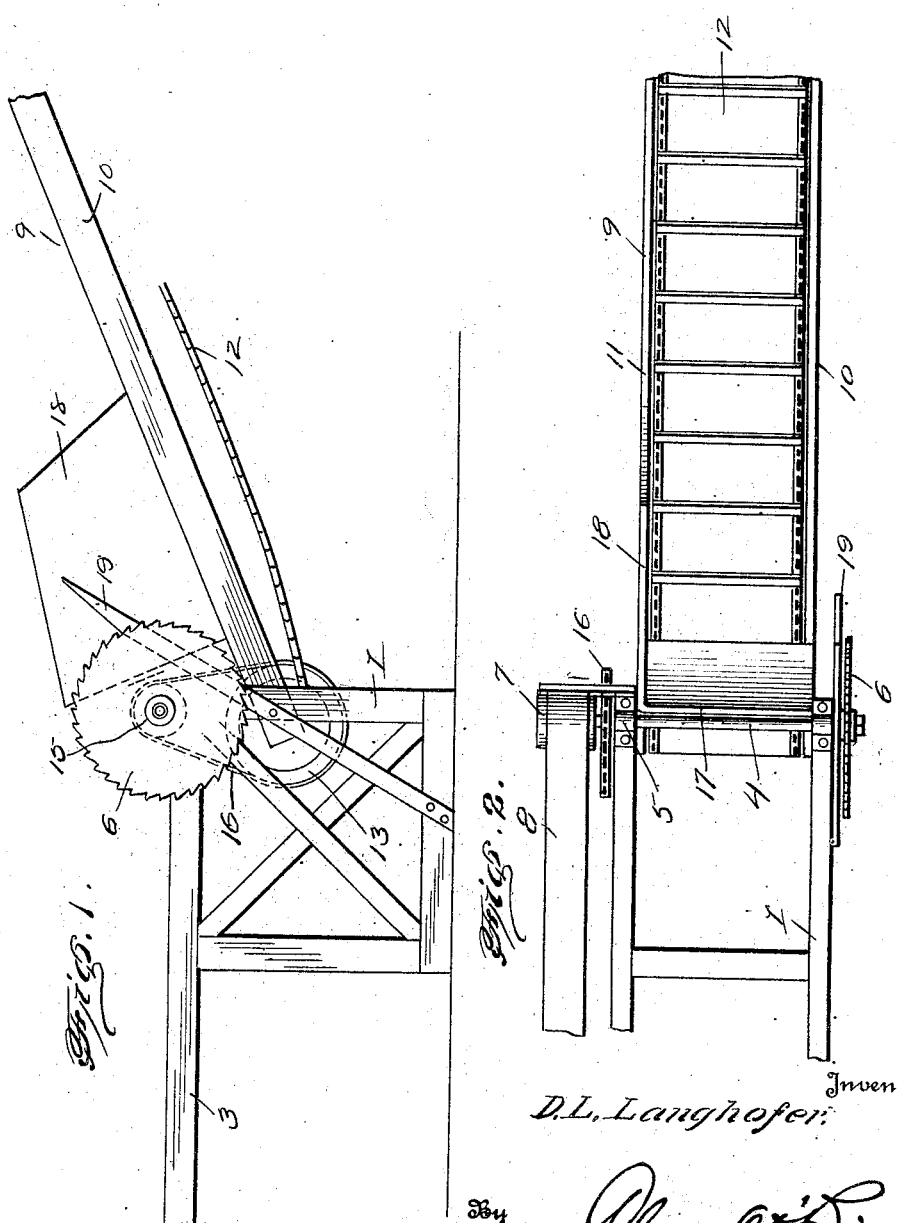
Inventor
D. L. Langhofer
By
Clarence O'Brien
Attorney Patented Apr. 13, 1926.

1,580,616

UNITED STATES PATENT OFFICE.

DAN L. LANGHOFER, OF LEBO, KANSAS.

CORN-TOPPING MACHINE.

Application filed December 26, 1924. Serial No. 758,202.

*To all whom it may concern:*

Be it known that I, DAN L. LANGHOFER, a citizen of the United States, residing at Lebo, in the county of Coffey and State of Kansas, have invented certain new and useful Improvements in a Corn-Topping Machine, of which the following is a specification.

This invention relates to improvements in topping machines and has for its primary object to provide a simple and efficient means for severing the head of cane and kaffir corn, milo, maize and the like, and depositing the severed heads upon a conveyor by which they are conveyed to and discharged into the body of a wagon.

One of the important objects of the present invention is to provide a corn topping machine of the above mentioned character, which is adapted to be associated with a tractor whereby the cutting and conveying means is operated by the power obtained from the tractor.

A further object of the invention is to provide a corn topping machine of the above mentioned character, wherein means is associated with the conveyor for causing the head of the corn to be properly positioned thereon so that the rotary cutter may sever the stalks, additional means being provided for guiding the stalks to the cutter.

A further object of the invention is to provide a corn topping machine of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1 is a side elevation of the machine, and

Figure 2 is a fragmentary top plan view.

In the drawings wherein for the purpose of illustration is shown the preferred embodiment of my invention, the numeral 1 designates a supporting frame which is adapted to be positioned forwardly of a tractor of any well known construction. Side bars 3 extend rearwardly from the upper portion of the frame and are secured at their rear ends to the respective sides of the tractor in any suitable manner. A shaft 4 extends transversely across the top of the frame 1 adjacent the forward end thereof, and is journaled in suitable bearings 5. A circular cutting blade 6 is supported on one end of the shaft 4 and the purpose thereof will hereinafter be more fully described. A pulley 7 is carried by the opposite end of the shaft 4 and is in alignment with the drive pulley of the tractor (not shown), a belt 8 being disposed over the pulleys whereby the shaft 4 is adapted for rotation.

A conveyor frame designated generally by the numeral 9 includes the parallel side bars 10 and 11 is secured at its rear end to the forward upper portion of the frame 1 and the conveyor frame extends upwardly at an incline for a suitable distance. An endless conveyor or elevator designated generally by the numeral 12 is associated with the conveyor frame 9 and the same is adapted to be actuated through the medium of a drive pulley 13 the pulley 13 being in alignment with a pulley 15 secured on the shaft 4, a belt 16 passing over the aligning pulley. This construction permits the simultaneous operation of the rotary cutter blade 6 and the elevator 12.

An angular gauge is associated with the conveyor frame 9, one side of the gauge extending transversely across the conveyor frame adjacent the transverse shaft 4 as illustrated at 17, the other side of the gauge extending along the upper face of the lower portion of the side bar 11 of the conveyor frame as illustrated at 18. The gauge is formed of sheet metal and extends upwardly from the conveyor frame for a suitable distance, any suitable means being provided for securing the same in position. As is illustrated in Figure 2 of the drawing, the side 18 of the gauge is disposed opposite of the circular cutting blade 6.

A guide 19 is secured on the frame 1 and extends upwardly and outward from the forward portion thereof, the upper end of the guide being disposed adjacent the circular cutting blade 6 and above the lower rear portion of the conveyor frame 9.

In operation, the cane or kaffir corn is positioned between the guide 19 and the lower rear portion of the conveyor frame 9 so that the head of the corn will engage the gauge 18. As the stalks of the corn are moved into the path of the circular cutting blade 6, the heads of the corn will be severed and will fall upon the endless conveyor 12, the latter elevating the severed heads and discharging the same into the body of a suitable wagon.

The provision of a corn topping machine of the above mentioned character, will enable the heads of cane, kaffir corn, milo maize and the like to be severed in a simple and efficient manner and further will save considerable time and labor and also prevent any unnecessary waste.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A corn topping machine comprising a frame, a conveyor frame extending upwardly therefrom, a rotary cutter blade mounted to one side and at the bottom end of the conveyor frame, a sheet metal angular gage secured to the conveyor frame, one side thereof extending transversely across the conveyor frame adjacent the bottom end thereof, the other end of the gage being disposed on the side of the conveyor frame opposite the cutter blade and extending away from the axis of the cutter, and guide means mounted on said first mentioned frame and disposed adjacent the cutter blade for guiding the corn to the latter.

In testimony whereof I affix my signature.

DAN L. LANGHOFER.